United States Patent [19]
Yang

[11] Patent Number: 6,098,183
[45] Date of Patent: *Aug. 1, 2000

[54] METHOD OF DEBUGGING IN A COMPUTER SYSTEM

[75] Inventor: Jen-Chung Yang, Taipei, Taiwan

[73] Assignee: Mitac International Corp., Hsinchu, Taiwan

[ * ] Notice: This patent issued on a continued prosecution application filed under 37 CFR 1.53(d), and is subject to the twenty year patent term provisions of 35 U.S.C. 154(a)(2).

[21] Appl. No.: 08/734,393

[22] Filed: Oct. 17, 1996

[51] Int. Cl.⁷ .................................................. G06F 11/00
[52] U.S. Cl. ............................................. 714/31; 714/38
[58] Field of Search ..................... 395/183.07, 183.01, 395/183.05, 704, 183.14; 714/38, 31, 37, 44, 46

[56] References Cited

U.S. PATENT DOCUMENTS

| | | | |
|---|---|---|---|
| 4,837,764 | 6/1989 | Russello | 714/46 |
| 5,228,039 | 7/1993 | Knoke et al. | 395/183.04 |
| 5,581,695 | 12/1996 | Knoke et al. | 395/183.04 |
| 5,615,331 | 3/1997 | Toorians et al. | 395/182.07 |
| 5,630,048 | 5/1997 | La Joie et al. | 395/183.01 |
| 5,640,542 | 6/1997 | Whitsel et al. | 395/183.01 |
| 5,680,620 | 10/1997 | Ross | 395/183.01 |

*Primary Examiner*—Robert W. Beausoliel, Jr.
*Assistant Examiner*—Pierre E. Elisca
*Attorney, Agent, or Firm*—Oblon, Spivak, McClelland, Maier & Neustadt, P.C.

[57] ABSTRACT

In a computer system which has a system memory, an integrated circuit socket that is normally used for mounting a BIOS memory thereon, an input/output port, and a central processing unit connected to the system memory, the integrated circuit socket and the input/output port, a method of debugging in the computer system includes mounting a debugging memory which is programmed with a debugging routine on the integrated circuit socket, connecting an external computer terminal to the input/output port, and activating the computer system such that the central processing unit executes the debugging routine and such that the central processing unit is capable of downloading and executing software instruction codes from the external computer terminal.

16 Claims, 2 Drawing Sheets

METHOD OF DEBUGGING IN A COMPUTER SYSTEM

BACKGROUND OF THE INVENTION

1. Field of the Invention

The invention relates to a computer system, more particularly to a method of debugging in a computer system.

2. Description of the Related Art

A conventional method of debugging in a computer system includes the following steps: (a) detaching the central processing unit (CPU) of the computer system that is to be tested from a CPU socket on a motherboard of the computer system, and attaching the CPU to an electrical socket unit of a controller which is programmed to execute a debugging routine; (b) attaching the electrical socket unit to the CPU socket of the motherboard; and (c) activating the controller to perform the debugging routine to verify the computer system.

It has been found that the conventional method is only suited for use with a CPU that operates below a specified operating speed. In view of the rapid progress in terms of the operating speed of the CPU, the conventional method is rapidly becoming obsolete. In addition, the number of pins of the electrical socket unit of the controller is fixed. Thus, the controller cannot be used if the number of pins of the CPU is changed. Moreover, surface mounting technology is now commonly used to mount the CPU onto the motherboard. As such, the CPU cannot be detached from the motherboard for attachment onto the electrical socket unit of the controller.

Presently, when developing a new version of BIOS software, the new object codes must be stored in a BIOS memory, such as a read-only memory (ROM), before running the BIOS software on a computer system for debugging. As such, if an error has been detected, another BIOS memory must be programmed with the modified object codes, and the debugging operation has to be repeated anew. Thus, the conventional software debugging operation takes a lot of time to complete and is not economical.

SUMMARY OF THE INVENTION

Therefore, the object of this invention is to provide a fast, simple and cost-effective method of debugging in a computer system.

According to this invention, a method of debugging is provided in a computer system which has a system memory, an integrated circuit socket that is normally used for mounting a BIOS memory thereon, an input/output port, and a central processing unit connected to the system memory, the integrated circuit socket and the input/output port. The method comprises mounting a debugging memory which is programmed with a debugging routine on the integrated circuit socket, connecting an external computer terminal to the input/output port, and activating the computer system such that the central processing unit executes the debugging routine and such that the central processing unit is capable of downloading and executing software instruction codes from the external computer terminal.

The software instruction codes from the external computer terminal may include BIOS object codes to be stored in the system memory by the central processing unit, or those of a hardware testing program. The debugging routine enables the central processing unit to check for abnormalities in the system memory. The system memory includes an on-board memory device and may further include an expansion memory device to be used instead of the on-board memory device if the latter is unavailable or cannot be used. In addition, the debugging routine enables the central processing unit to check for failure of the input/output port and to initialize the input/output port as a terminal and download port if the input/output port is in order.

Preferably, the central processing unit provides its register values to the external computer terminal when executing the software instruction codes from the external computer terminal to permit viewing of the register values on the external computer terminal.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
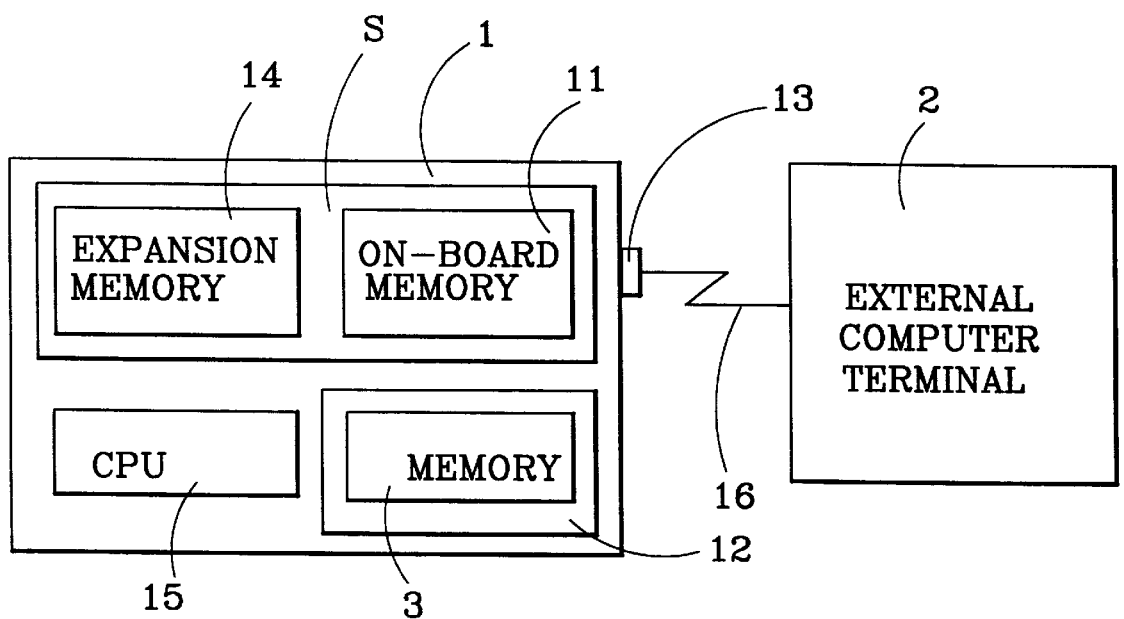
FIG. 1 illustrates the environment of the debugging method of this invention.
Figure 2:
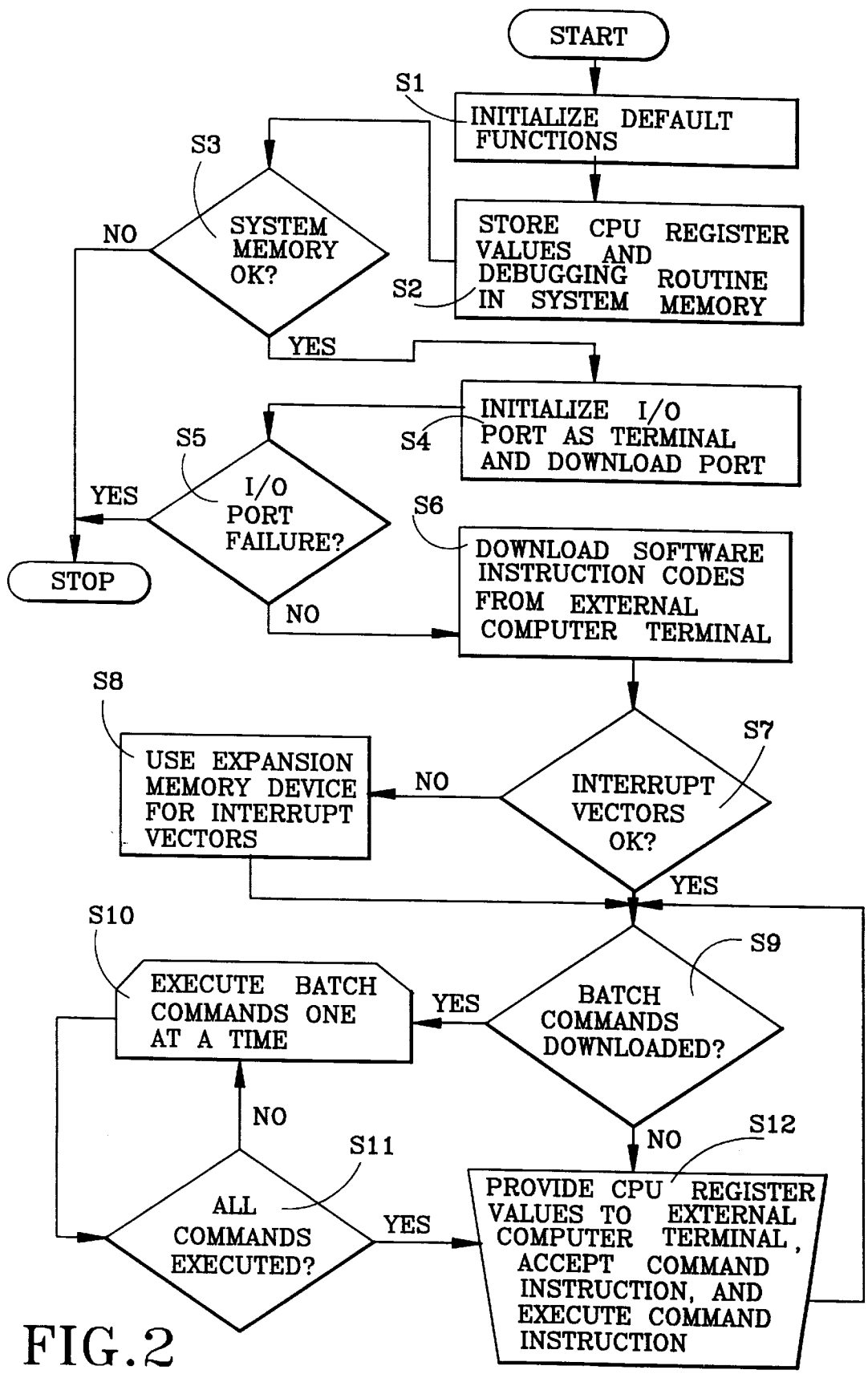
FIG. 2 is a flowchart which illustrates the operation of a computer system in accordance with the preferred embodiment of a debugging method of this invention.

Referring to FIGS. 1 and 2, the preferred embodiment of a debugging method of this invention is to be performed so as to verify a computer system 1 which has an on-board memory device 11, such as a DRAM or SHADOW-RAM, an integrated circuit (IC) socket 12 that is normally used for mounting a BIOS memory (not shown) with BIOS object codes programmed therein, an input/output (I/O) port 13 that may be a serial or parallel port, an optional expansion memory device 14, and a central processing unit (CPU) 15 connected to the on-board memory device 11, the IC socket 12, the I/O port 13 and the expansion memory device 14. The memory devices 11, 14 cooperatively form a system memory (S) of the computer system 1. An electrical cable 16 connects an external computer terminal 2 to the I/O port 13. In the debugging method of this invention, a non-volatile debugging memory 3, which has been programmed with a debugging routine that is to be executed by the CPU 15, is mounted on the IC socket 12 instead of the BIOS memory. Software instruction codes, such as the BIOS object codes of a new version of BIOS software or the instruction codes of a hardware testing program, are provided by the external computer terminal 2 to the computer system 1. Thus, the CPU 15 is capable of executing the debugging routine when the computer system 1 is activated, such as during a POWER-ON or reset action.

The debugging routine enables the CPU 15 to perform debug initialization, connection set-up, data transfer and testing operations. As shown in FIG. 2, in step (S1), the default functions of the computer system 1, such as the chipset configuration, the registers, the memories, etc., are initialized by the CPU 15. Then, in step (S2), the CPU register values and the debugging routine in the debugging memory 3 are stored by the CPU 15 in the on-board memory device 11 of the system memory (S). Storage of the CPU register values in the on-board memory device 11 permits resumption of a previous operation of the CPU 15 after a resume-from-debug operation.

If the on-board memory device 11 is unavailable or cannot be used, the CPU 15 stores both the CPU register values and the debugging routine from the debugging memory 3 in the expansion memory device 14 of the system memory (S) to permit continued execution of the debugging routine.

In step (S3), the CPU 15 checks for abnormalities in the system memory (S). That is, the CPU 15 checks the on-board memory device 11 or the expansion memory device 14 if the latter is in use. The debugging operation is stopped if abnormality of the on-board memory device 11 was detected and the expansion memory device 14 is not installed, or if abnormality of the expansion memory device 14 was detected and the onboard memory device 11 is unavailable or cannot be used. In steps (S4) and (S5), the CPU 15 initializes the I/O port 13 as a terminal and download port, and then checks for failure of the I/O port 13. The debugging operation is stopped if a port failure condition was detected. Otherwise, in step (S6), the CPU 15 downloads the software instruction codes from the external computer terminal 2 and stores the same in the on-line memory device 11 or the expansion memory device 14, if the latter is in use.

In step (S7), the CPU 15 checks if the interrupt vectors are in order. If not, indicative of the fact that the on-board memory device 11 is unavailable or cannot be used, the CPU 15 uses the expansion memory device 14 for the interrupt vectors, as indicated in step (S8).

In step (S9), the CPU 15 detects whether batch commands have been downloaded from the external computer terminal 2. In steps (S10) and (S11), if batch commands have been downloaded, the CPU 15 executes the batch commands one at a time until all of the batch commands have been executed or until a command error has been detected. In step (S12), if no batch command was downloaded or when all of the batch commands have been executed or a command error has been detected, the CPU 15 provides its register values to the external computer terminal 2 for viewing on a display unit of the latter, accepts interactive command instructions from the external computer terminal 2 and executes the command instructions from the external computer terminal 2.

The advantages and characterizing features of the debugging method of this invention are as follows:

1. Both BIOS debugging and system debugging can be conveniently achieved in the debugging method of this invention. When developing a new version of BIOS software, there is no need for storing the new object codes in a BIOS memory so as to run the BIOS software on the computer system for debugging. Thus, software debugging can be accomplished economically in a reduced amount of time.

2. The method of this invention permits board-level diagnostics of the computer system. That is to say, with the use of the expansion memory device, the debugging operation can still be performed even without the presence of the on-board memory device, and by using the display unit of the external computer terminal to view the operating status of the computer system, testing of the computer system is possible even though the latter is not provided with a display unit.

3. If the BIOS object codes are compressed, decompression can be performed at the external computer terminal before downloading to the computer system.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A method of debugging in a computer system having a system memory, an integrated circuit socket that is normally used for mounting a BIOS memory, an input/output port, and a central processing unit connected to the system memory, the integrated circuit socket and the input/output port, the method comprising the steps of:

mounting a debugging memory, different from a BIOS memory, which is programmed with a debugging routine which is different from BIOS on the integrated circuit socket, wherein said debugging memory replaces a BIOS memory during a debugging operation;

connecting an external computer terminal to the input/output port; and activating the computer system such that the central processing unit immediately executes the debugging routine which is different from BIOS when the computer system is activated and such that the central processing unit downloads and executes a plurality of software instruction codes from the external computer terminal, wherein the central processing unit provides a plurality of register values of the central processing unit to the external computer terminal when executing the plurality of software instruction codes from the external computer terminal to permit viewing of the plurality of register values on the external computer terminal.

2. The method according to claim 1, wherein the plurality of software instruction codes from the external computer terminal include a plurality of BIOS object codes to be stored in the system memory by the central processing unit.

3. The method according to claim 1, wherein the plurality of software instruction codes from the external computer terminal include a plurality of instruction codes of a hardware testing program.

4. The method according to claim 1, wherein the debugging routine enables the central processing unit to check for abnormalities in the system memory.

5. The method according to claim 1, wherein the debugging routine enables the central processing unit to check for failure of the input/output port and to initialize the input/output port as a terminal and download port if the input/output port is in order.

6. The method according to claim 1, wherein the system memory includes an on-board memory device.

7. The method according to claim 6, wherein the plurality of software instruction codes from the external computer terminal include a plurality of BIOS object codes to be stored in the on-board memory device by the central processing unit.

8. The method according to claim 6, wherein the plurality of software instruction codes from the external computer terminal include a plurality of software instruction codes of a hardware testing program.

9. The method according to claim 6, wherein the debugging routine enables the central processing unit to check for abnormalities in the on-board memory device.

10. The method according to claim 6, wherein the debugging routine enables the central processing unit to check for failure of the input/output port and to initialize the input/output port as a terminal and download port if the input/output port is in order.

11. The method according to claim 6, wherein the system memory further includes an expansion memory device to be used when one of the on-board memory device is unavailable and the on-board memory device cannot be used.

12. The method according to claim 11, wherein the debugging routine enables the central processing unit to use the expansion memory device for interrupt vectors when one of the on-board memory device is unavailable and the on-board memory device cannot be used.

13. The method according to claim 11, wherein the plurality of software instruction codes from the external computer terminal include a plurality of BIOS object codes to be stored in one of the on-board memory device and the expansion memory device by the central processing unit.

14. The method according to claim 11, wherein the plurality of software instruction codes from the external computer terminal include a plurality of software instruction codes of a hardware testing program.

15. The method according to claim 11, wherein the debugging routine enables the central processing unit to check for abnormalities in the on-board memory device and the expansion memory device.

16. The method according to claim 11, wherein the debugging routine enables the central processing unit to check for failure of the input/output port and to initialize the input/output port as a terminal and download port if the input/output port is in order.

* * * * *